United States Patent
Baig et al.

(10) Patent No.: US 11,238,604 B1
(45) Date of Patent: Feb. 1, 2022

(54) DENSIFYING SPARSE DEPTH MAPS

(71) Applicant: Apple Inc., Cupertino, CA (US)

(72) Inventors: Mohammad Haris Baig, San Jose, CA (US); Daniel Ulbricht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 16/789,788

(22) Filed: Feb. 13, 2020

Related U.S. Application Data

(60) Provisional application No. 62/813,803, filed on Mar. 5, 2019.

(51) Int. Cl.
*G06T 7/579* (2017.01)
*G06N 20/00* (2019.01)
*G06T 7/571* (2017.01)
*G06T 7/73* (2017.01)

(52) U.S. Cl.
CPC ............. *G06T 7/579* (2017.01); *G06N 20/00* (2019.01); *G06T 7/571* (2017.01); *G06T 7/73* (2017.01); *G06T 2207/10028* (2013.01); *G06T 2207/20081* (2013.01)

(58) Field of Classification Search
CPC .. G06K 9/22; G06K 2209/27; G06K 9/00597; G06T 2207/30201; G06T 2207/20084
See application file for complete search history.

(56) References Cited

U.S. PATENT DOCUMENTS

| | | | |
|---|---|---|---|
| 8,711,206 B2 | 4/2014 | Newcombe et al. | |
| 9,177,387 B2 * | 11/2015 | Marks | G06T 7/248 |
| 9,676,330 B2 * | 6/2017 | Takemae | G06T 7/60 |
| 9,690,984 B2 * | 6/2017 | Butler | G06T 7/50 |
| 9,824,417 B2 * | 11/2017 | Kim | G06F 3/0304 |
| 10,353,271 B2 * | 7/2019 | Wang | G06K 9/00208 |
| 2012/0218256 A1 * | 8/2012 | Murray | G06T 7/593 345/419 |
| 2015/0030233 A1 | 1/2015 | Nasiopoulos et al. | |

FOREIGN PATENT DOCUMENTS

CN  104346608  2/2015

OTHER PUBLICATIONS

McCormac, John; Handa, Ankur; Davison, Andrew; and Leutenegger, Stefan; "SemanticFusion: Dense 3D Semantic Mapping with Convolutional Neural Networks"; Dyson Robotics Lab, Imperial College London, Sep. 28, 2016; pp. 1-7.

* cited by examiner

*Primary Examiner* — Yosef Kassa
(74) *Attorney, Agent, or Firm* — Thompson Hine LLP

(57) ABSTRACT

A system and techniques that use one or more machine learning models to predict a dense depth map (e.g., of depth values for all pixels or at least more pixels than a sparse estimation source (e.g., SLAM)). In some implementations, the machine learning model includes two sub models (e.g., neural networks). The first machine learning model predicts computer vision data such as semantic labels and surface normal directions from an input image. This computer vision data will be used to add to or otherwise improve sparse depth data. Specifically, a second machine learning model takes the semantic labels and surface normal directions from and sparse depth data (e.g., 3D points) from a sparse point estimation source (e.g., SLAM) as inputs and outputs a depth map. The output depth map effectively densities the initial depth data (e.g., from SLAM) by providing depth data for additional pixels of the image.

20 Claims, 6 Drawing Sheets

DENSIFYING SPARSE DEPTH MAPS

CROSS-REFERENCE TO RELATED APPLICATION

This application claims the benefit of U.S. Provisional Application Ser. No. 62/813,803 filed Mar. 5, 2019, which is incorporated herein in its entirety.

TECHNICAL FIELD

The present disclosure generally relates to computer vision, and in particular, to systems, methods, and devices for implementing machine learning/prediction computer vision techniques that identify depths in images.

BACKGROUND

Like human vision, computer vision tasks generally attempt to reason from one or more images. Various computer vision techniques are used to determine depths, e.g., distances of objects from an image capture device. Some systems use multiple, coordinated sensors, RGB-D sensors, or other specialized equipment to determine such depths. Including such specialized equipment in mobile phones or other devices, however, can add to the size and cost of those devices. Other techniques use images from a single camera and attempt to determine depths from those images. For example, some simultaneous localization and mapping (SLAM) techniques are used to identify feature points in a sequence of images (e.g., video frames) that are captured by an image capture device in real time, e.g., at or around the time the images are captured. Such techniques can be quite successful in identifying depths for a few points (e.g., some corner points, some edge points, and other points that have distinctive characteristics). Unfortunately, the depth data provided by SLAM and other such techniques is generally sparse. For example, for a given image of hundreds or thousands of pixels, the techniques may provide depth points for only a small percentage of the pixels, e.g. less than five percent. Moreover, there may be very few, if any, depths for portions of the images with little texture or variation, such as table tops, wall surfaces, and the like.

SUMMARY

In some implementations, a system that includes one or more machine learning models is configured and used to predict a dense depth map for an image for which sparse depth data is available. The depth map may provide depth values for all pixels or at least more pixels than the sparse estimation source (e.g., SLAM or other sparse depth sensor technique) that provided the sparse depth data. In some implementations, the machine learning model includes two sub models (e.g., neural networks). The first machine learning model (M1) predicts computer vision data such as semantics and surface normal directions from an input image. This computer vision data will be used to add or otherwise improve sparse depth data. Specifically, a second machine learning model (M2) takes the semantics and surface normal directions from M1 and sparse depth data (e.g., 3D points) from a sparse point estimation source (e.g., SLAM) as inputs and outputs a dense depth map.

The computer vision information (e.g., the semantic labels and normal directions) may enable the second machine learning model to make better depth predictions than it would otherwise using the sparse depth data alone. For example, the second machine learning model may have learned to use information about which pixels of an image correspond to a single object such as a wall known from the semantic predictions and characteristics of the object such whether adjacent pixels of a flat wall surface have the same or similar normal directions known from the surface normal direction predictions, to make better depth predictions. As a specific example, the model may receive sparse depth data that identifies that two pixels (separated by 10 pixels in between) are each 10.00 ft. away from the current capture device pose location. The model may also receive semantic data that indicates that both pixels and all 10 pixels in between are semantically labelled "wall" and that all of the pixels have the same or very similar surface normal directions. Given this information as input, the model may more accurately predict depths for all of the pixels than it would otherwise in the absence of the semantic/normal data, e.g., knowing only the estimated depths of the two pixels.

Some implementations involve a method performed at an electronic device having a processor. The method involves obtaining an image of a physical setting from an image capture device. The method produces a semantic prediction and a surface normal prediction using a first machine learning model using the image as input. The method produces depth data (e.g., 3D point locations, a sparse depth map, etc.) using a depth estimator (e.g., SLAM) on the image. The depth data is generally sparse, meaning that the depth data is insufficient to associate a depth with every pixel of the image. The method outputs a depth map using a second machine learning model using the semantic prediction, the surface normal prediction, and the depth data as inputs. The depth map is generally denser than the depth data, providing depth estimates for more of the pixels of the image than the depth data from the depth estimator (e.g., SLAM).

The second machine learning model of the implementations described above and elsewhere in this description can be trained on the same device that will determine or otherwise output the depth maps. For example, an end user can perform a training process using his or her mobile device using images from a single image capture device. In some implementations, for example, the second machine learning model is trained by obtaining sample images from the image capture device. For example, the user may capture a video (e.g., a sequence of images) of his or her room or other physical setting while moving the device or walking around. The training further involves producing training depth maps using a structure-from-motion (SFM) technique on the sample images. While these processes may be slow and computationally expensive and thus ill-suited for real time depth determinations, they can be used for creating training data, e.g., ground truth data, that does not necessarily need to be produced in real time. The training process then produces outputs using the image and adjusts the model by comparing the outputs to the training depth data. Specifically, the training process produces semantic predictions and surface normal predictions using the first machine learning model using the sample images as input, produces depth data sets using the depth estimator (e.g., SLAM) on the sample images, and outputs depth maps using the second machine learning model using the semantic predictions, the surface normal predictions, and the depth data sets as inputs. The second machine learning model is adjusted based on comparing the training depth maps and the output depth maps, e.g., using a loss function, ect. The SFM-based depth maps used for training may not include data for every pixel. Accordingly, in training the second machine learning model, the comparing may exclude (e.g., mask out) pixels that are not predicted by the SFM technique. In this example, a system on a user's device can be trained using device specific content (e.g., accounting for the particular intrinsics and extrinsics of the image capture device), without specialized equipment, and with relatively little user burden, e.g., requiring that the user simply capture a relatively short video or other sequence of images to use for the training.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
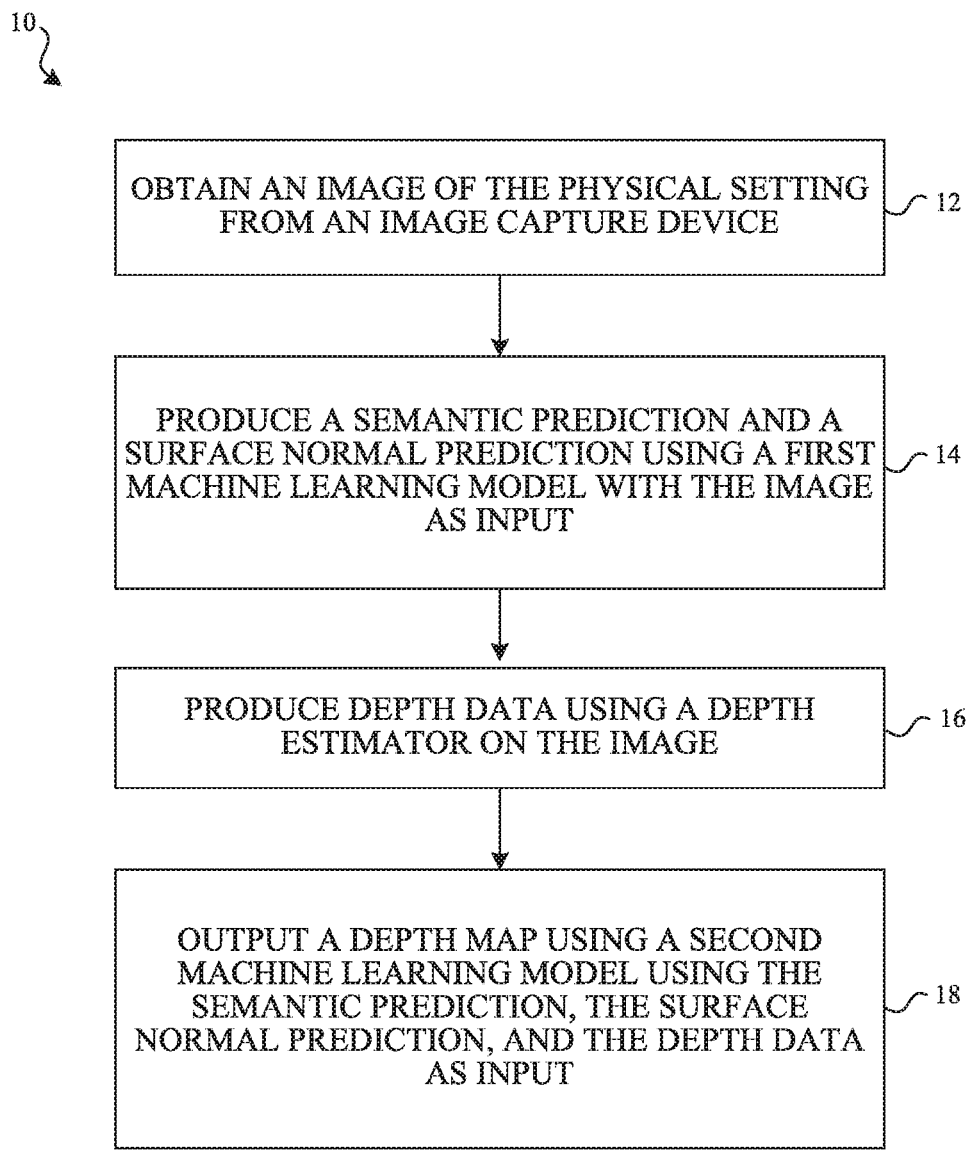
FIG. 1 is a flowchart representation of a method of predicting a depth map in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a flowchart representation of a method 10 of predicting a dense depth map in accordance with some implementations. In some implementations, the method 10 is performed by a device (e.g., device 700 of FIG. 7). The method 10 can be performed at a mobile device, head mounted device (HMD), desktop, laptop, or server device. In some implementations, the method 10 is performed by processing logic, including hardware, firmware, software, or a combination thereof. In some implementations, the method 10 is performed by a processor executing code stored in a non-transitory computer-readable medium (e.g., a memory).

At block 12, the method 10 obtains an image of the physical setting from an image capture device. In some implementations, the image is a live image captured by an image capture device (e.g., a camera) that is part of the device that is performing method 10. For example, a device, such as device 700 of FIG. 7, may receive images from one or more image capture devices (e.g., image sensor system(s) 1014). In some implementations, the image capture device captures a sequence of images (e.g., video frames) some or all of which are to be rendered on a display (e.g., display(s) 712) of the device. Depth maps may be provided for some or all of the images of such a sequence of images using method 10.

At block 14, the method 10 produces a semantic prediction and a surface normal prediction using a first machine learning model (e.g., one or more neural networks) using the image as input. The first machine learning model can include multiple sub-models, the sub-models comprising a semantic prediction model and a surface normal prediction model. The first machine learning model, e.g., one or more neural networks, can be trained using labelled training data. For example, training an exemplary machine learning model can use input images that are labelled/annotated with labelled semantics and surface normal directions. In another example, the surface normal directions are labelled automatically for training purposes based on depth information known or determined for the input images, e.g., based on the input images having been captured with a RGB-D camera or using a depth sensor that gives distances from the sensor. The depth information can be used to determine/estimate normal directions. The input images along with the known/ground truth data (e.g., segmentation labels and surface normal directions) can then be used to train the machine learning model to predict these computer vision items. For example, a loss function of a neural network can compare the known segment labels and surface normal directions with predicted segment labels and surface normal directions, and iteratively adjust the node weighting or other attributes of the network to improve the accuracy of the neural network predictions.

At block 16, the method 10 produces depth data (e.g., 3D point locations, a sparse depth map, etc.) using a depth estimator (e.g., SLAM) on the image. The depth data can, but does not necessarily, have an image format that corresponds to the image. In one example, the depth data is in the form of an image that includes values at certain pixel locations that represent depths (e.g., distances from the image capture device) of the physical object represented by the corresponding pixel in the image. In another example, the depth data is in the form of a table or other data structure that simply associates depths with pixel coordinates. In another example, the depth data is in the form of three dimensional (3D) point locations. For example, a SLAM process may be used to provide 3D surface points (e.g., the 3D locations of the points in a world coordinate system/ space) and a pose of the image capture device (e.g., in the world coordinate system/space). The 3D point locations provided by SLAM or another such technique can be converted into depths (or otherwise used to determine depths) relative to the image capture device. Accordingly, in some implementations, depth data is determined by projecting three dimensional (3D) points determined by a SLAM or similar technique based on a pose of the image capture device during capture of the image and (e.g., extrinsics) and focal length or distortion parameters of the image capture device (e.g., instrinsics).

At block 18, the method 10 outputs a depth map using a second machine learning model using the semantic prediction, the surface normal prediction, and the depth data as input. The second machine learning model can utilize or mimic integration techniques that reconstruct point locations or depths by using known depths and integrating them over an area or window within a known boundary, e.g., within an area given the same semantic label. For example, given a handful of normal directions within a wall surface and the boundaries of that wall surface based on the semantic labels and normal directions, the model may algorithmically determine 3D positions of all points in the area. The model may initially use a defined algorithm and learn to improve predictions using the algorithm. In an alternative implementation, the model is trained without using an initial algorithm and essentially learns how to integrate to depth on its own.

An exemplary method of training the second machine learning model is described with respect to FIG. 2 below.

The outputted depth map of block 18 will generally be denser than the depth data that was input to the second machine learning model. Accordingly, the second machine learning model may effectively densify an original depth map of the depth data or otherwise add depths to the depth data. In some implementations, the output depth map is thus denser than the input depth data, e.g., the output depth map may provide depth estimates for more portions (e.g., pixels) of the image than the input depth data. In some implementations, the output depth map provides a depth estimate for each pixel of the image. Outputting the depth map can involve providing the depth map to another process on the device, storing the depth map for later use, or displaying the depth map or content based on the depth map, as examples.

Figure 2:
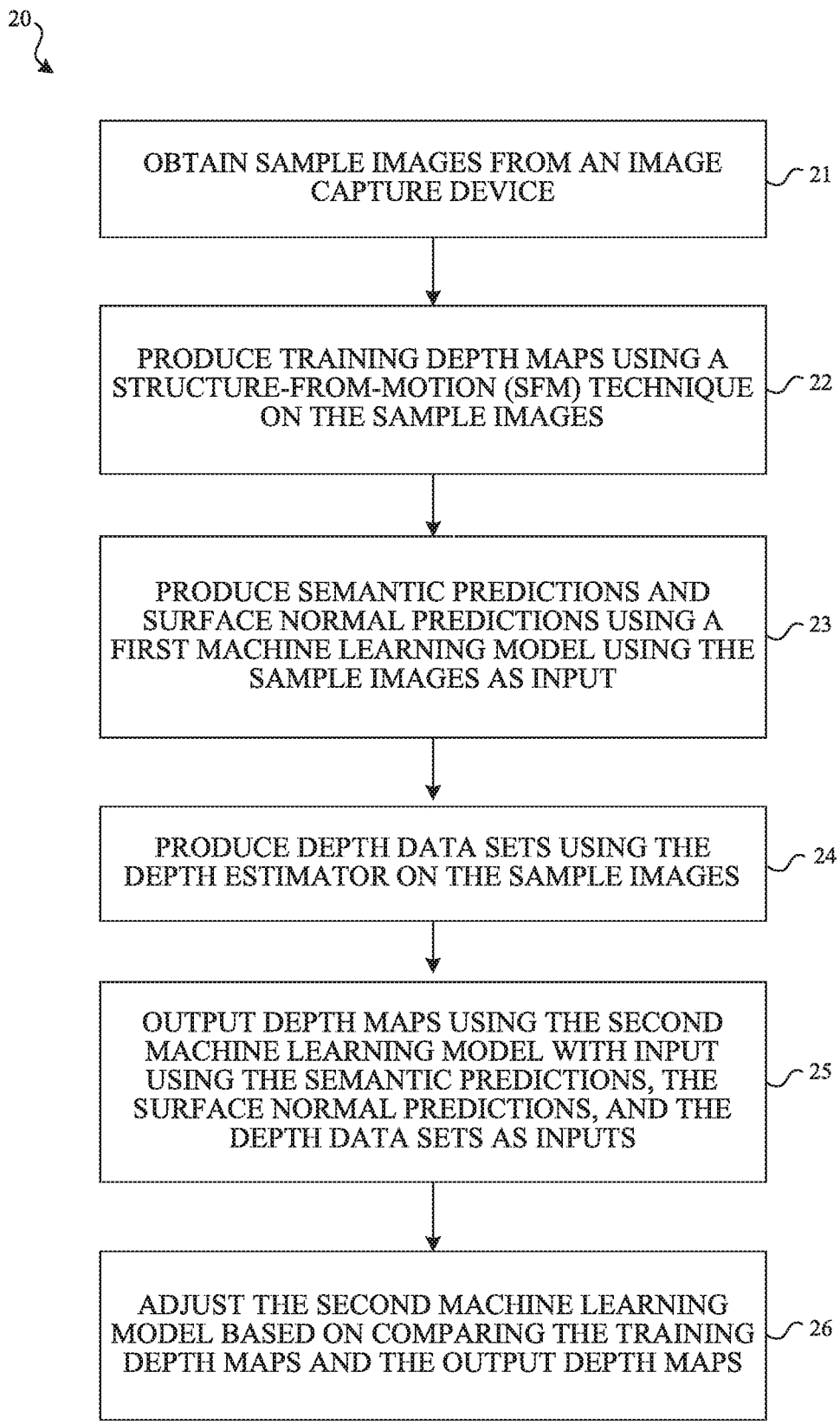
FIG. 2 is a flowchart representation of a method of training a machine learning model to predict a depth map in accordance with some implementations.

FIG. 2 is a flowchart representation of a method 20 of training a machine learning model (e.g., the second machine learning model of FIG. 1) to predict a depth map in accordance with some implementations. In some implementations, the method 20 is performed by a device (e.g., device 700 of FIG. 7). The method 20 can be performed at a mobile device, head mounted device (HMD), desktop, laptop, or server device. In some implementations, the method 20 is performed by processing logic, including hardware, firmware, software, or a combination thereof. In some implementations, the method 20 is performed by a processor executing code stored in a non-transitory computer-readable medium (e.g., a memory).

At block 21, the method 20 obtains sample images from the image capture device. The image capture device may be the same device that will be used after training (e.g., at inference time) to determine depth maps. In other words, in one example, a user device includes one or more models that are trained by a user and then used by the same user to capture new images and make depth predictions about the new images. The sample images may be captured as a video or sequence of images by a user. In some implementations, the user is instructed to create the sample images via visual or audio instructions instructing the user to capture video for a predetermined amount of time, until instructed to stop, or until some other predetermined condition is satisfied.

At block 22, the method 20 produces training depth maps using a structure-from-motion (SFM) technique on the sample images. While these SFM techniques and related processes may be slow and computationally expensive and thus ill-suited for real time depth determinations, they can be used for creating training data, e.g., ground truth data, that does not need to be produced in real time. In alternative methods, a different technique is used to produce the training depth maps, for example, using a depth sensor or other technique that provides accurate depth data but that is not necessarily appropriate for use in real-time depth predictions given computational or other requirements.

At blocks 23-24, the method 20 produces the inputs that will be input to the second machine learning model during the training process. At block 23, the method produce semantic predictions and surface normal predictions using the first machine learning model (e.g., the first machine learning model of FIG. 1) using the sample images as input. For example, each image of a video sequence may be input to the model to produce the semantic label and surface normal direction predictions for that image. At block 24, the method produces depth data sets using the depth estimator (e.g., SLAM) on the sample images. For example, each image of the video sequence may be analyzed by a SLAM technique to produce sparse depth data for each image.

At block 25, the method 20 outputs depth maps using the second machine learning model using the semantic predictions, the surface normal predictions, and the depth data sets as input. The second machine learning model can then be adjusted (e.g., via gradient descent or other learning techniques) based on comparing the training depth maps and the output depth maps (e.g., based on a loss function that measures a loss based on distance between depth estimates of the training depth maps and depth estimates of the output depth maps). In some implementations, the training is an iterative process in which an image is input, the output compared with a corresponding output, the second machine learning model adjusted, and then the process repeats for the next image in the set of sample images.

The training depth maps may not include data for every pixel of an image. Accordingly, in training the second machine learning model, the comparing may exclude (e.g., mask out) pixels that are not predicted by the SFM technique.

In this example of FIG. 2, the second machine learning model of a system on a user's device can be trained using a user device using user-specific content (e.g., accounting for the particular intrinsics and extrinsics of the user's image capture device and at least one of the physical settings in which the device may ultimately be used), without specialized equipment, and with relatively little user burden, e.g., requiring that the user simply capture a video or other sequence of images to use for the training.

Figure 3:
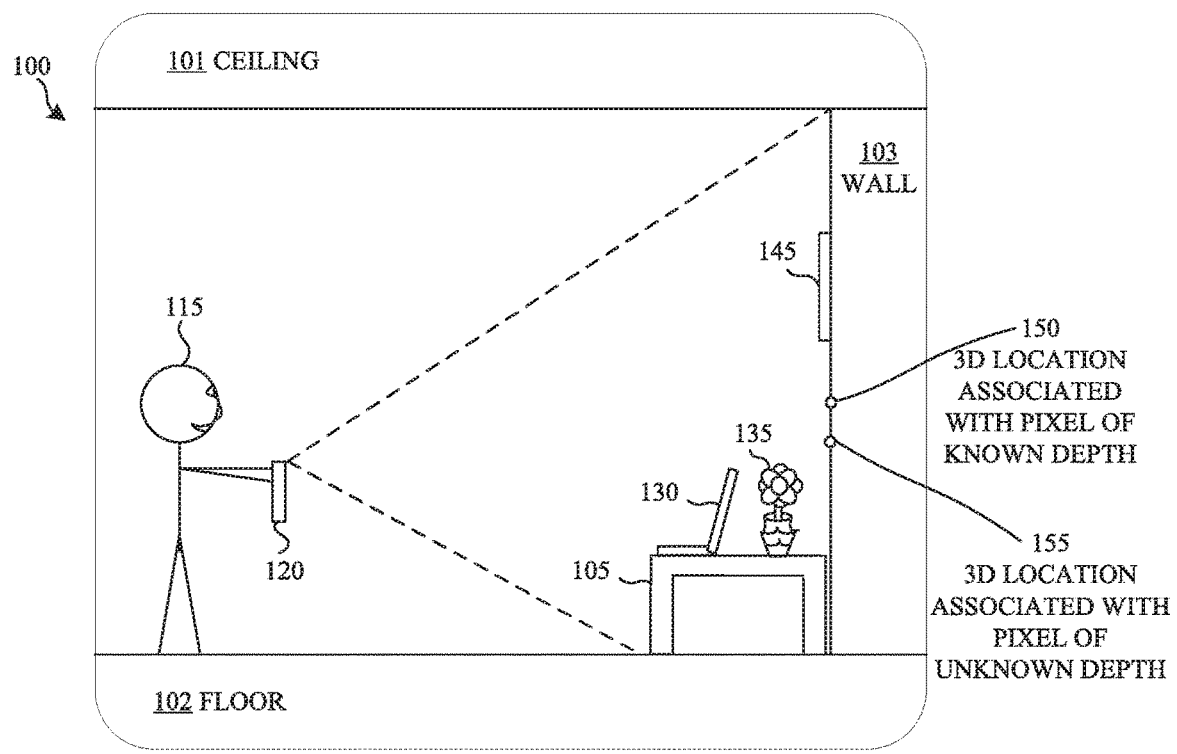
FIG. 3 is a block diagram illustrating a device capturing a first image of a physical setting.
Figure 4:
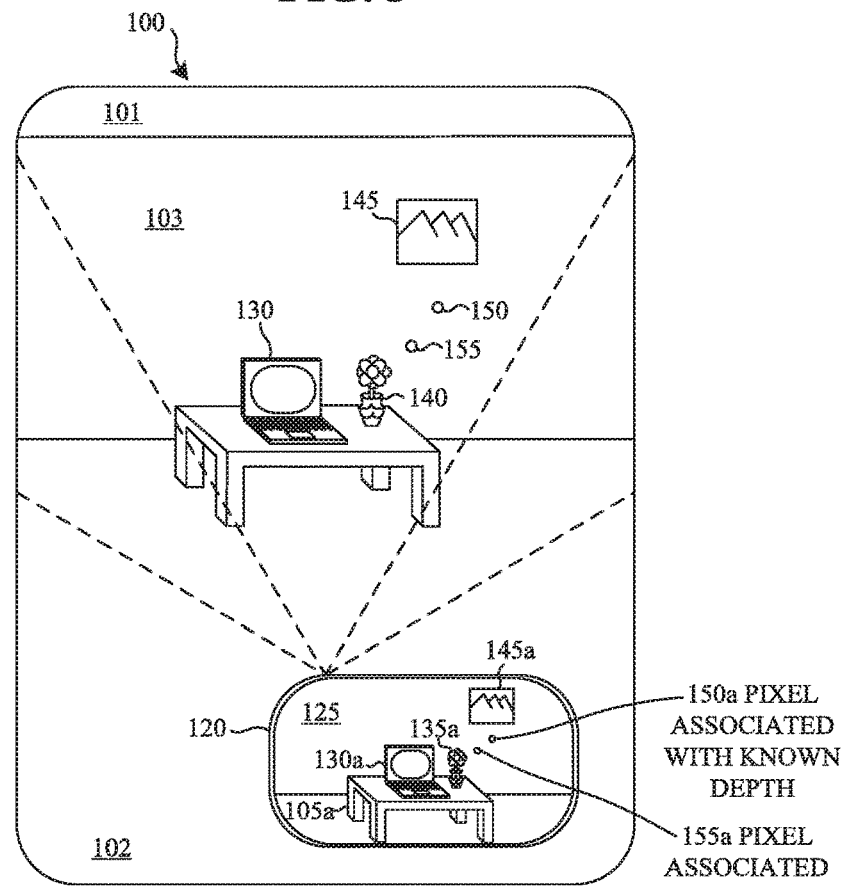
FIG. 4 is a block diagram illustrating another view of the device of FIG. 3 capturing the first image of the physical setting.

FIGS. 3-4 illustrate an exemplary physical setting 100 in which images can be captured and reasoned about using techniques disclosed herein. FIG. 3 is a block diagram illustrating a device 120 capturing a first image 125 (FIG. 4) of a physical setting 100. In this example, the physical setting includes a ceiling 101, a floor 102, a wall 103, a table 105, a laptop 130, a vase with a flower 135, and a wall painting 145. The user 115 is depicted holding the device 120 and capturing an image of the physical setting 100. FIG. 4 is a block diagram illustrating another view of the device 120 capturing the first image 125 of the physical setting 100. In this example, the first image 125 includes a table depiction 105a of table 105, a laptop depiction 130a of laptop 130, a vase with flower depiction 135a of the vase with the flower 135, and a wall painting depiction 145a of wall painting 145.

A first 3D location 150 associated with a pixel 150a of known depth is depicted. This first 3D location 150 may correspond to a 3D position that corresponds to a SLAM detected feature. A SLAM process, for example, may identify such a point as a feature based on a marking, pattern, or other distinguishing feature on the wall 103. In some implementations, the first 3D location 150 is one of a set of points for features returned by a SLAM process. The depth for the associated pixel 150 may be determined based on the SLAM information (e.g., a 3D position in world space and the capture device pose) as well as intrinsics of the image capture device. For example, this information can be used to determine a distance of the first 3D location 150 from the device 120.

For purposes of illustrating techniques of certain implementations disclosed herein, a second 3D location 155 associated with a pixel 155a of unknown depth is also depicted. In this example, this second 3D location 155 was not identified by a SLAM process and depth information is initially unknown for this second 3D location 155 and the associated pixel 155a. The initial depth data provided by the SLAM process and additional information about segmentation labels and surface normal directions are used to predict a depth for the pixel 155a associated with the second 3D location. The segmentation labels and surface normal directions can be determined using a first machine learning model on the image 125, for example, as discussed with respect to block 14 of FIG. 1. The semantic labels and surface normal directions along with the depth data for the first 3D location 150 and associated pixel 150a and any other known depth data are input into a second machine learning model and used to predict a depth map, as discussed with respect to block 18 of FIG. 1. The depth map can include depth values for pixels, such as pixel 155a, for which depth values were previously unknown, e.g., not included in the depth data associated with the SLAM process results, etc.

Figure 5:
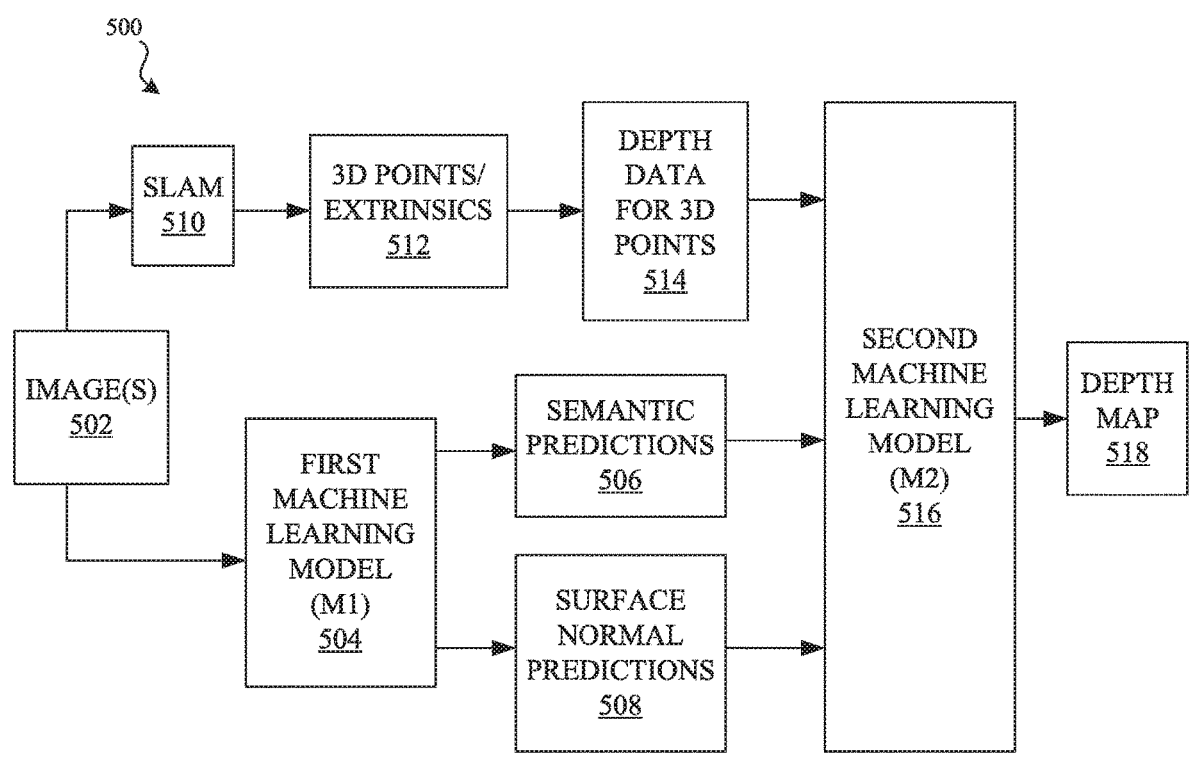
FIG. 5 is a block diagram of a process that implements machine learning models to predict depths in accordance with some implementations.

FIG. 5 is block diagram of a process 500 that implements machine learning models to predict depths in accordance with some implementations. In this example, an image or images 502 are input to a first machine learning model (M1) 504 that produces semantic predications 506 (e.g., per pixel semantic label predictions) and surface normal predictions 508 (e.g., per pixel surface normal direction predictions). The image or images 502 are also processed via SLAM process 510 that produces 3D points (e.g., 3D locations of features) and extrinsics (e.g., capture device pose) 512 that may be used to provide depth data 514 for the 3D points (e.g., enabling projection of the 3D points based on the image capture device's pose/viewpoint). The semantic prediction 506, surface normal predictions 508, and depth data 514 are provided to a second machine learning model (M2) 516 which produces output depth map 518, for example, as discussed with respect to block 18 of FIG. 1.

Figure 6:
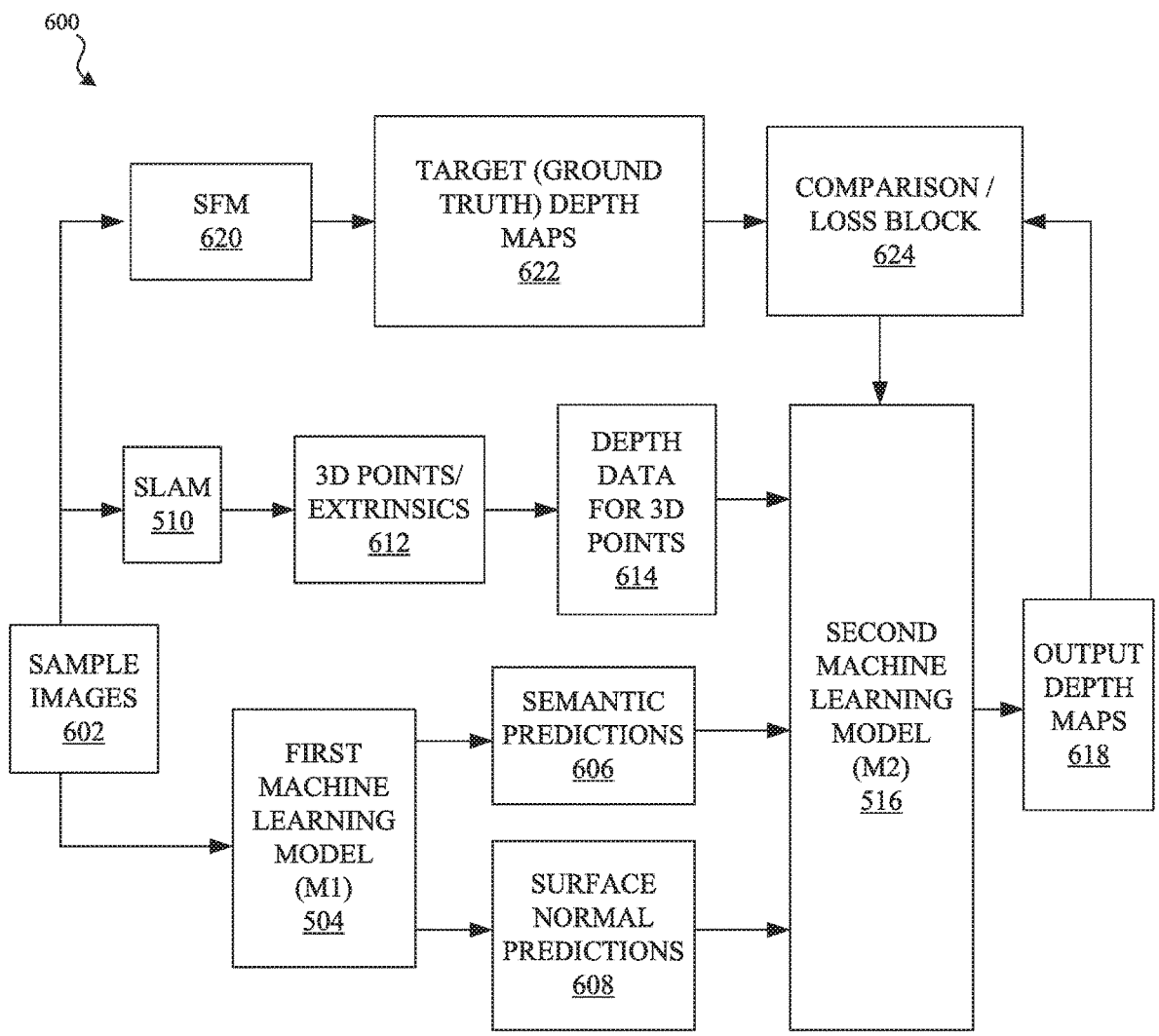
FIG. 6 is a block diagram of a process that trains a machine learning model to predict a depth map in accordance with some implementations.

FIG. 6 is block diagram of a process that trains a machine learning model (e.g., second machine learning model (M2) 516) to predict a depth map in accordance with some implementations. In this example, sample images 602 are input to a structure-from-motion (SFM) block 620 to produce target (e.g., ground truth) depth maps 622. The sample images 602 (e.g., individually or in groups) are also input to a first machine learning model (M1) 504 that produces semantic predications 606 (e.g., per pixel semantic label predictions) and surface normal predictions 608 (e.g., per pixel surface normal direction predictions). The sample images 602 (e.g., individually or in groups) are also processed via SLAM process 510 that produces 3D points (e.g., 3D locations of features) and extrinsics (e.g., capture device pose) 612 that may be used to provide depth data 614. The semantic prediction 606, surface normal predictions 608, and depth data 614 are provided to the second machine learning model (M2) 516 which produces output depth maps 618.

The second machine learning model (M2) 516 can then be adjusted (e.g., via gradient descent or other learning techniques) based on comparing the training depth maps and the output depth maps (e.g., based on a loss function that measures a loss based on distance between depth estimates of the training depth maps and depth estimates of the output depth maps). Specifically, these output depth maps 618 and the target (e.g., ground truth) depth maps 622 are compared at comparison/loss block 624. The comparison/loss is then used to update the second machine learning model, for example, by changing the weights or other attributes of a neural network, to attempt to reduce the differences between the depth maps or other loss metrics. In some implementations, the training is an iterative process in which a sample image is input, an output depth map produced, the output depth map compared with a corresponding target(ground truth) depth map, and the second machine learning model adjusted. This process may repeat for the next image in the set of sample images and continue repeating for additional sample images until a predetermined criteria is satisfied or the set of sample images is exhausted. In one implementation, a user is requested to obtain additional sample images if the set of initial sample images provided by the user does not produce training sufficient to satisfy predetermined training criteria.

Figure 7:
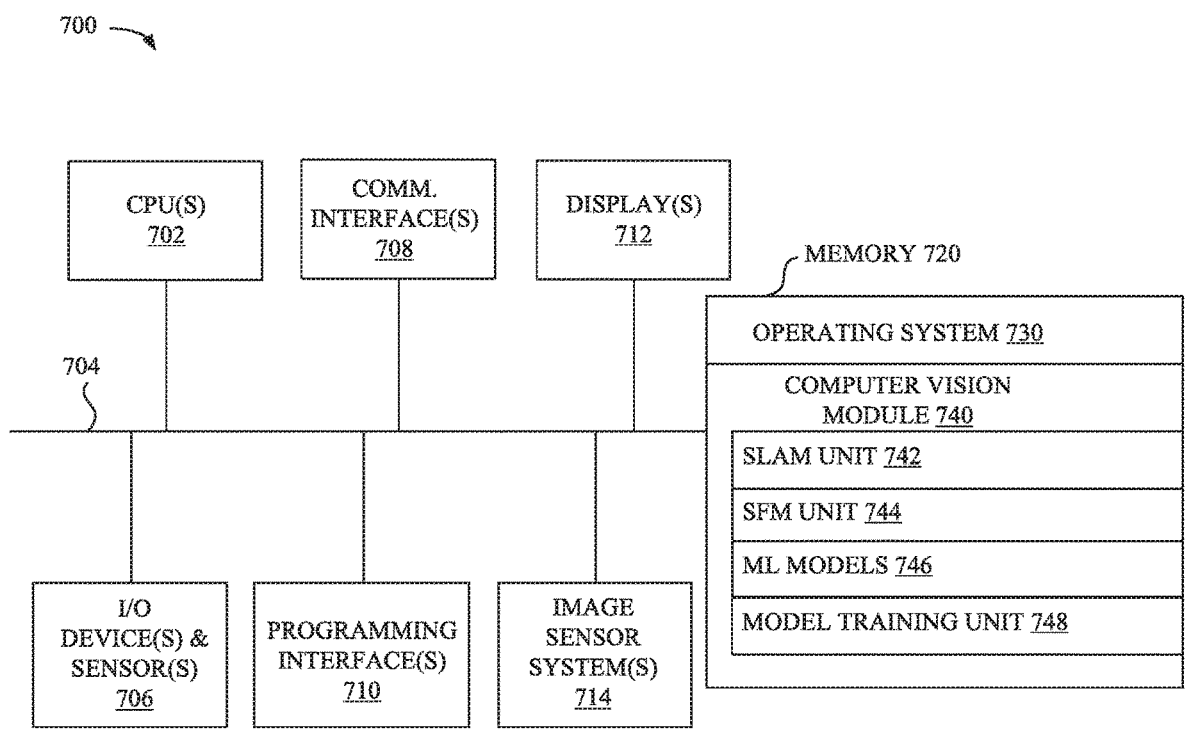
FIG. 7 is a block diagram of an example system architecture of an exemplary device in accordance with some implementations.

FIG. 7 is a block diagram of an example system architecture of an exemplary device configured to facilitate computer vision tasks in accordance with one or more implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 710, one or more displays 712, one or more interior or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 712 are configured to present images from the image sensor system(s) 714. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 712 correspond to diffractive, reflective, polarized, holographic, etc. waveguide displays. For example, the device 700 includes a single display. In another example, the device 700 is a head-mounted device that includes a display for each eye of the user.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and a computer vision module 740.

The operating system 730 includes procedures for handling various basic system services and for performing hardware dependent tasks. In some implementations, the computer vision module 740 is configured to facilitate a computer vision tasks such as depth detection. The SLAM unit 742 is configured to produce depth data for certain points, e.g., a sparse depth data set, and image capture device pose (e.g., 3D location and orientation) information. The SFM unit 744 is configured to use structure-from-motion techniques to determine depth. The machine learning models 746 (e.g., first machine learning model 504 and second machine learning model 516 of FIGS. 5-6) are configured to contribute to depth determinations via one or more of the techniques disclosed herein. The model training unit 748 is configured to train a machine learning model (e.g., the second machine learning model 516 of FIGS. 5-6) to determine depth maps, for example, using sparse depth data, segment label predictions, and surface normal predictions. Although these modules and units are shown as residing on a single device (e.g., the device 700), it should be understood that in other implementations, any combination of these modules and units may be located in separate computing devices.

Moreover, FIG. 7 is intended more as a functional description of the various features which are present in a particular implementation as opposed to a structural schematic of the implementations described herein. As recognized by those of ordinary skill in the art, items shown separately could be combined and some items could be separated. For example, some functional modules and units shown separately in FIG. 7 could be implemented in a single module or unit and the various functions of single functional blocks could be implemented by one or more functional blocks in various implementations. The actual number of modules and units and the division of particular functions and how features are allocated among them will vary from one implementation to another and, in some implementations, depends in part on the particular combination of hardware, software, or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the terms "or" and "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on

What is claimed is:

1. A method, comprising:
at an electronic device having a processor:
obtaining an image of a physical setting from an image capture device;
producing a semantic prediction and a surface normal prediction using a first machine learning model with input comprising the image;
producing depth data using a depth estimator on the image; and
outputting a depth map using a second machine learning model with input comprising the semantic prediction, the surface normal prediction, and the depth data.

2. The method of claim 1, wherein the depth map is denser than the depth data, the depth map providing depth estimates for more portions of the image than the depth data.

3. The method of claim 1, wherein the depth map is denser than the depth data, the depth map providing depth estimates for more pixels of the image than the depth data.

4. The method of claim 1, wherein the depth map provides a depth estimate for each pixel of the image.

5. The method of claim 1, wherein the depth estimator is a simultaneous localization and mapping (SLAM) technique.

6. The method of claim 5, wherein the depth data is determined by projecting three dimensional (3D) points determined by the SLAM technique based on:
a pose of the image capture device during capture of the image; and
focal length or distortion parameters of the image capture device.

7. The method of claim 1, wherein the first machine learning model comprises multiple sub-models, the sub-models comprising a semantic prediction model and a surface normal prediction model.

8. The method of claim 1, wherein outputting the depth map comprises displaying the depth map.

9. The method of claim 1, wherein the second model is trained by:
obtaining sample images from the image capture device;
producing training depth maps using a structure-from-motion (SFM) technique on the sample images;
producing semantic predictions and surface normal predictions using the first machine learning model with input comprising the sample images;
producing depth data sets using the depth estimator on the sample images;
outputting depth maps using the second machine learning model with input comprising the semantic predictions, the surface normal predictions, and the depth data sets; and
adjusting the second machine learning model based on comparing the training depth maps and the output depth maps.

10. The method of claim 9, wherein the comparing excludes pixels that are not predicted by the SFM technique.

11. A system comprising:
a non-transitory computer-readable storage medium; and
a processor coupled to the non-transitory computer-readable storage medium, wherein the non-transitory computer-readable storage medium comprises program instructions that, when executed on the processor, cause the system to perform operations comprising:
obtaining an image of a physical setting from an image capture device;
producing a semantic prediction and a surface normal prediction using a first machine learning model with input comprising the image;
producing depth data using a depth estimator on the image; and
outputting a depth map using a second machine learning model with input comprising the semantic prediction, the surface normal prediction, and the depth data.

12. The system of claim 11, wherein the depth map provides depth estimates for more pixels of the image than the depth data.

13. The system of claim 11, wherein the depth map provides a depth estimate for each pixel of the image.

14. The system of claim 11, wherein the depth estimator is a simultaneous localization and mapping (SLAM) technique.

15. The system of claim 14, wherein the depth data is determined by projecting three dimensional (3D) points determined by the SLAM technique based on:
a pose of the image capture device during capture of the image; and
focal length or distortion parameters of the image capture device.

16. The system of claim 11, wherein the second model is trained by:
obtaining sample images from the image capture device;
producing training depth maps using a structure-from-motion (SFM) technique on the sample images;
producing semantic predictions and surface normal predictions using the first machine learning model with input comprising the sample images;
producing depth data sets using the depth estimator on the sample images;
outputting depth maps using the second machine learning model with input comprising the semantic predictions, the surface normal predictions, and the depth data sets; and
adjusting the second machine learning model based on comparing the training depth maps and the output depth maps, wherein the comparing excludes pixels that are not predicted by the SFM technique.

17. A non-transitory computer-readable storage medium, storing program instructions computer-executable on a computer to perform operations comprising:
obtaining an image of a physical setting from an image capture device;
producing a semantic prediction and a surface normal prediction using a first machine learning model with input comprising the image;

producing depth data using a depth estimator on the image; and outputting a depth map using a second machine learning model with input comprising the semantic prediction, the surface normal prediction, and the depth data.

18. The non-transitory computer-readable storage medium of claim 17, wherein the depth map provides depth estimates for more pixels of the image than the depth data.

19. The non-transitory computer-readable storage medium of claim 17, wherein the depth data is determined by projecting three dimensional (3D) points determined by a SLAM technique based on:

a pose of the image capture device during capture of the image; and focal length or distortion parameters of the image capture device.

20. The non-transitory computer-readable storage medium of claim 17, wherein the second model is trained by:

obtaining sample images from the image capture device;

producing training depth maps using a structure-from-motion (SFM) technique on the sample images;

producing semantic predictions and surface normal predictions using the first machine learning model with input comprising the sample images;

producing depth data sets using the depth estimator on the sample images;

outputting depth maps using the second machine learning model with input comprising the semantic predictions, the surface normal predictions, and the depth data sets; and adjusting the second machine learning model based on comparing the training depth maps and the output depth maps, wherein the comparing excludes pixels that are not predicted by the SFM technique.

* * * * *